(12) United States Patent
Tsujimura

(10) Patent No.: US 6,327,419 B1
(45) Date of Patent: Dec. 4, 2001

(54) COMPOSITE RECORDING/PLAYBACK DEVICE

(75) Inventor: Katsuhito Tsujimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/007,584

(22) Filed: Jan. 15, 1998

(30) Foreign Application Priority Data

Jan. 17, 1997 (JP) .................................................. 9-006139

(51) Int. Cl.⁷ .......................... H04N 5/781; H04N 5/928
(52) U.S. Cl. ................................ 386/52; 386/92; 386/102
(58) Field of Search .......................... 386/52, 125, 126, 386/95, 105, 106, 96, 109, 111, 112, 124, 64, 81, 82, 4, 46–92, 98, 102; H04N 5/781, 5/928

(56) References Cited

U.S. PATENT DOCUMENTS 5,731,922 * 3/1998 Yamasaki et al. ...................... 360/53
5,926,603 * 7/1999 Tanaka et al. ......................... 386/53
6,047,099 * 4/2000 Oku ....................................... 386/52

* cited by examiner

*Primary Examiner*—Robert Chevalier
(74) *Attorney, Agent, or Firm*—Frommer Lawrence & Haug LLP; William S. Frommer; Joe H. Shallenburger

(57) ABSTRACT

A composite record/playback device capable of independently using recording media of different forms, i.e. a video tape record/playback block and a hard disc drive block, comprises a video tape record/playback unit, a hard disc drive, a first encoder, a first decoder and a second decoder for receiving and expanding a playback signal of the hard disc drive. By providing a first decoder and a second decoder, the signals played back by the video tape record/playback unit and the hard disc drive can be independently expanded by the first decoder and the second decoder. This allows an AB roll editing by the playback of the video tape record/playback unit and the hard disc drive.

5 Claims, 4 Drawing Sheets

COMPOSITE RECORDING/PLAYBACK DEVICE

BACKGROUND OF THE INVENTION

1. Field of the Invention

The present invention relates to a composite record/playback device and more particularly to a composite record/playback device equipped with recording media of different forms and characteristics such as video tapes and hard disc drives.

2. Description of Related Art

Conventionally, there have existed composite record/playback devices equipped with recording media of different recording formats and access characteristics referred to as video tapes and hard disc drives, with a configuration of this kind of composite record/playback device being shown in FIG. 1.

FIG. 1 is a view showing an example configuration of a related composite record/playback device. According to a composite record/playback device 50 shown in FIG. 1, there is one input terminal 51 and one output terminal 52, with an encoder 53 for carrying out compression processing of a Serial Digital Interface (SDI) signal being connected at this input terminal 51. A video tape record/playback block 55 is connected to the output of the encoder 53 via a switch (SW) 54 and a hard disc drive block 58 is connected via a switch 56 and an SCSI (Small Computer System Interface) encoder 57. The output of the video tape record/playback block 55 is connected to a decoder 60 for carrying out expanding processing of the played back signal via a switch 59. The output of the hard disc drive block 58 is also connected to the decoder 60 via an SCSI decoder 61 and the switch 59. The output of the decoder 60 is connected to the output terminal 52 of this composite record/playback device 50. Further, the output of the video tape record/playback block 55 is connected to the switch 56 for changing over the input signal to the hard disc drive block 58 and the output of the SCSI decoder 61 is connected to the switch 54 for changing over the input signal to the video tape record/playback block 55.

With the above configuration, the composite record/playback device 50 is capable of simultaneously recording the same SDI signal at the video tape record/playback block 55 and the hard disc drive block 58 after the SDI signal is subjected to compression processing at the encoder 53, while expanding and outputting played back signals from the video tape record/playback block 55 and the hard disc drive block 58 with the played back signals being expanded at the decoder 60. Therefore, in addition to such basic recording/playback functions, the device 50 is capable of carrying out dubbing processing of signals from the video tape record/playback block 55 to the hard disc drive block 58 by switching over the switch 56 in such a manner as to select the output of the video tape record/playback block 55. In this case, for example, four times speed dubbing is possible by making the video tape record/playback block 55 play back at high speed. Further, equal speed dubbing from the hard disc drive block 58 to the video tape record/playback block 55 is also possible by changing the switch 54 over in such a manner as to select the output of the SCSI decoder 61.

However, the related composite record/playback device 50 only have one input terminal and one output terminal, and one encoder 53 and one decoder 60. It is therefore possible to be a composite recording device capable of simultaneously recording the same signal to the video tape record/playback block 55 and the hard disc drive block 58. However, it is not possible to be a composite playback device where the video tape record/playback block 55 and the hard disc drive block 58 are simultaneously played back with the played back signals then being independently utilized. Therefore, the video tape record/playback block 55 and the hard disc drive block 58 are simply physically put in the same frame to reduce the functionality as a composite.

SUMMARY OF THE INVENTION

As the present invention sets out to solve the aforementioned problems, it is an object of the present invention to provide a composite record/playback device capable of independently using recording media of different formats, i.e. a video tape record/playback block and a hard disc drive block.

According to the present invention, there is provided a composite recording/playback device having recording media of different forms, capable of individually recording and playing back while carrying out mutual dubbing as needed, comprising a video tape record/playback unit for performing linear record/playback processing using a tape-shaped medium, a hard disc drive for carrying out linear record/playback processing using a disc-shaped medium, a first encoder for compression processing a first signal and supplying the compression processed signal to at least one of the video tape record/playback unit and the hard disc drive unit, a first decoder for selectively receiving and expanding playback signals of the video tape record/playback unit or the hard disc drive, and a second decoder for receiving and expanding a playback signal of the hard disc drive.

According to the above configuration, by providing a first decoder and a second decoder, the signals played back by the video tape record/playback unit and the hard disc drive can be independently expanded by the first decoder and the second decoder, respectively. This allows an AB roll editing by the playback of the video tape record/playback unit and the hard disc drive.

DETAILED DESCRIPTION OF THE PREFERRED EMBODIMENT

The following is a detailed description with reference to the drawings of an embodiment of the present invention.

Figure 1:
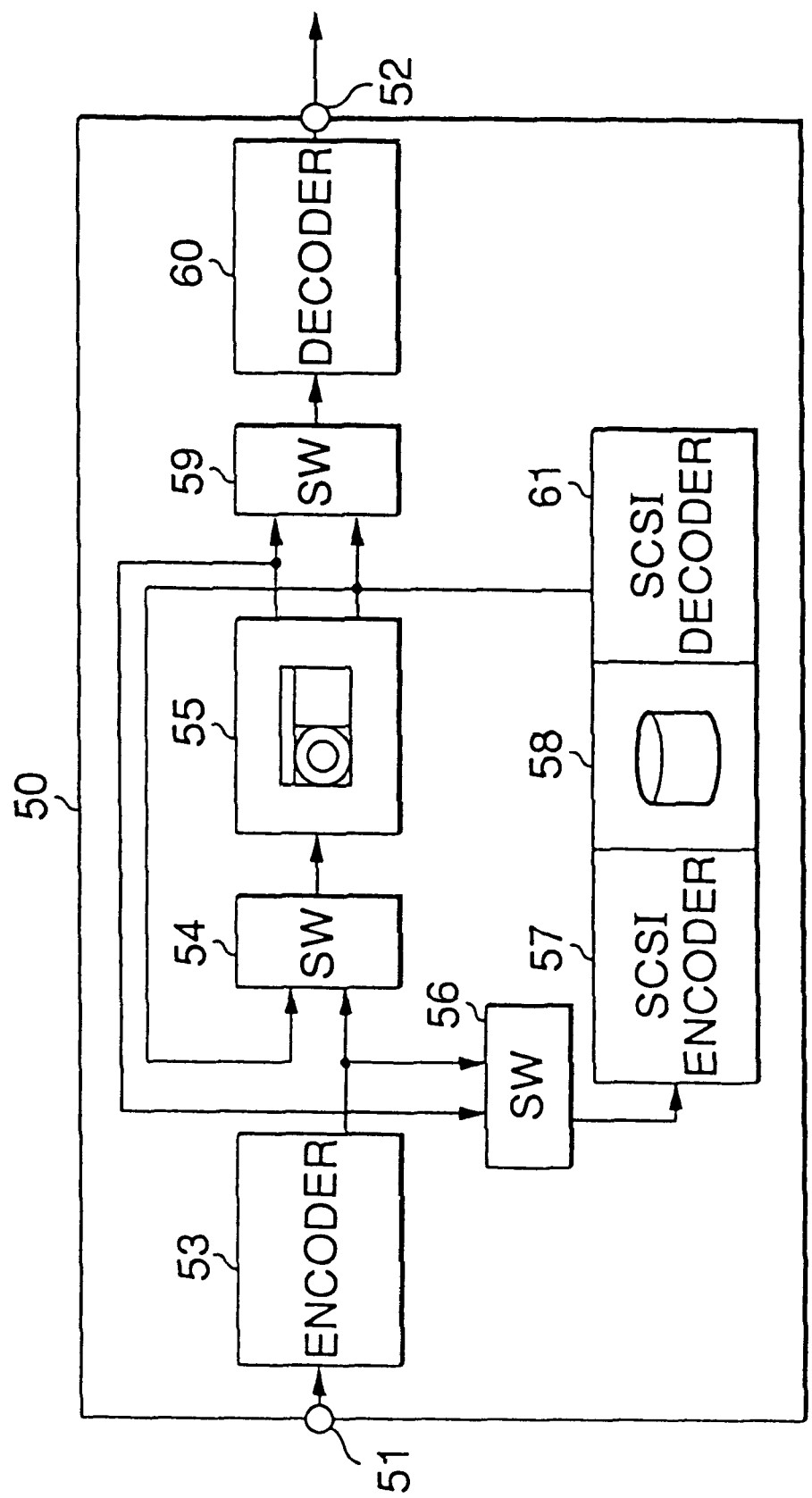
FIG. 1 is a view showing an example configuration of a related composite recording/playback device.
Figure 2:
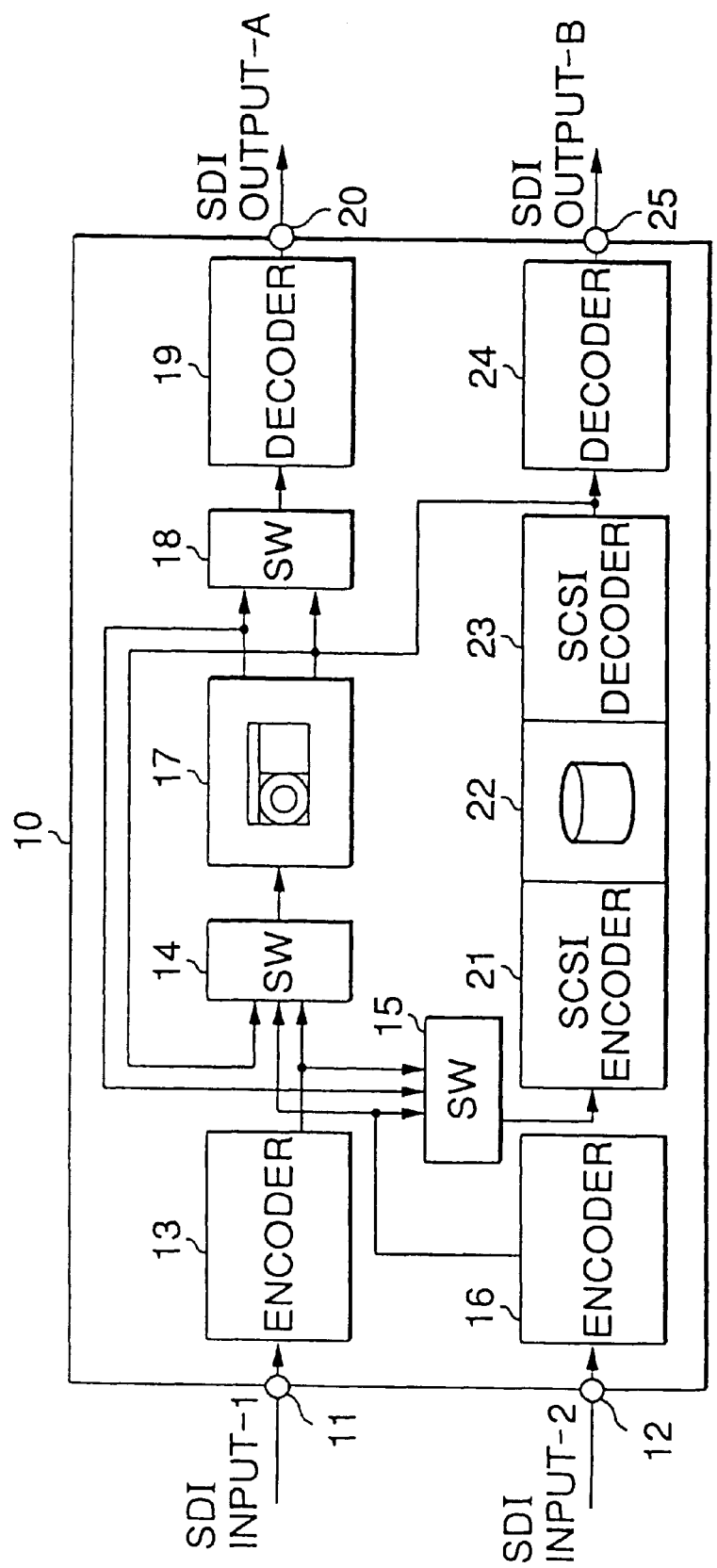
FIG. 2 is a block diagram showing a fundamental configuration of a composite record/playback device of the present invention.

FIG. 2 is a block diagram showing the fundamental configuration of a composite record/playback device of the present invention. In FIG. 2, the composite record/playback device 10 of the present invention has two input terminals, the input terminal 11 and the input terminal 12, each individually receiving differing SDI input signals. The input terminal 11 shown by "SDI input-1" is connected to the input of an encoder 13, with the output of the encoder 13 being connected to switches (SW) 14 and 15. The output of the switch 14 is connected to the input of a video tape record/playback block 17. The output of the video tape record/playback block 17 is then connected to a switch 18 and the switch 15. The output of the switch 18 is connected to a decoder 19, with the output of the decoder 19 being connected to an output terminal 20 of the composite recording/playback device 10 shown by "SDI output-A". The output of the switch 15 is connected to a hard disc drive block 22 via an SCSI encoder 21, with the output of the hard disc drive block 22 being connected to the input of a decoder 24 via an SCSI decoder 23 as well as being connected to the switch 18 and the switch 14. The output of the decoder 24 is connected to an output terminal 25 of the composite recording/playback device 10 shown by "SDI output-B".

Each of the encoders 13 and 16 receives an SDI signal constituted by a 4:2:2 composite digital video signal in which the audio signal is multiplexed, and carries out compression processing conforming to MPEG2 (Motion Pictures Experts Group 2) 4:4:2 MP@ML (Main Profile at Main Level). The decoders 19 and 24 then subject the compressed signal to expanding. The video tape record/playback block 17 and the hard disc drive block 22 therefore constitute a so-called 4:2:2 component digital video device.

The composite recording/playback device 10 has the following basic function as a result of changing over the switches 14, 15 and 18.

Firstly, there is a function where compressed signals processed by the encoder 13 or the encoder 16 are simultaneously or individually recorded by the video tape record/playback block 17 and the hard disc drive block 22 and the played back signal from the block 17 or 22 is then outputted via the decoder 19 or the decoder 24. This is achieved by switching over the switches 14 and 15 on the input side of the video tape record/playback block 17 and the hard disc drive block 22 so that the block 17 or 22 receives the output of the encoder 13 or the encoder 16 for processing signals that it is wished to record, and by switching over the switch 18 so that the decoder 19 receives the output of the video tape record/playback block 17.

Next, there is a high speed function for dubbing from the video tape record/playback block 17 to the hard disc drive block 22. This is achieved by changing over the switch 15 on the input side of the hard disc drive block 22 so that the hard disc drive block 22 receives the output of the video tape record/playback block 17 and then by using the four times playback function of the video tape record/playback block 17.

Next, there is a function for dubbing in the reverse direction of the above, that is, the function for dubbing at an equal speed from the hard disc drive block 22 to the video tape record/playback block 17. This is achieved by changing over the switch 14 on the input side of the video tape record/playback block 17 in such a manner that the video tape record/playback block 17 receives the output of the SCSI decoder 23.

Next, there is a function where the video tape record/playback block 17 and the hard disc drive block 22 simultaneously record independent signals and then play these recorded signals back separately. This is achieved by switching over the switch 14 on the input side of the video tape record/playback block 17 in such a manner that the video tape record/playback block 17 receive the output of the encoder 13, switching over the switch 18 on the output side of the video tape record/playback block 17 in such a manner that the decoder 19 receives the output of the video tape record/playback block 17, and switching over the switch 15 on the input side of the hard disc drive block 22 in such a manner that the hard disc drive block 22 receives the output of the encoder 16. The switches 14 and 15 may be changed over in such a manner as to connect the output of the encoder 16 to the video tape record/playback block 17 and connect the output of the encoder 13 to the SCSI encoder 21.

Next, there is a function for carrying out AB roll editing by simultaneously playing back signals recorded at the video tape record/playback block 17 and the hard disc drive block 22 and playing back signals for two channels recorded at the hard disc drive block 22. This is achieved by the switch 18 being switched over in such a manner that the decoder 19 receives the output of the video tape record/playback block 17 and outputs the played back signal of the video tape record/playback block 17 as "SDI output-A", and the decoder 24 outputs the played back signal of the hard disc drive block 22 as the "SDI output-B". The switch 18 is also switched over in such a manner that the decoder 19 receives one channel of the played back signals of the hard disc drive block 22 and the played back signals for the two channels of the hard disc drive block 22 are made to be outputted via the decoder 19 and the decoder 24.

Finally, there is a function of playing back signals for two channels recorded at the hard disc drive block 22 and recording a signal in the video tape record/playback block 17 after the signal is subjected to the AB roll editing. This is achieved by changing over the switch 18 so that the decoder 19 receives the signal for one channel played back by the hard disc drive block 22 and outputs the played back signal as "SDI output-A", having the decoder 24 output the played back signal for one channel of the hard disc drive block 22 as "SDI output-B", having a signal that has been externally AB roll edited inputted to the input terminal 11 or 12, and having the switch 14 changed over so that the video tape record/playback block 17 receives the output of the encoder 13 or the encoder 16.

Next, a description is given of when this composite recording/playback device 10 is applied to an AB roll editing system.

Figure 3:
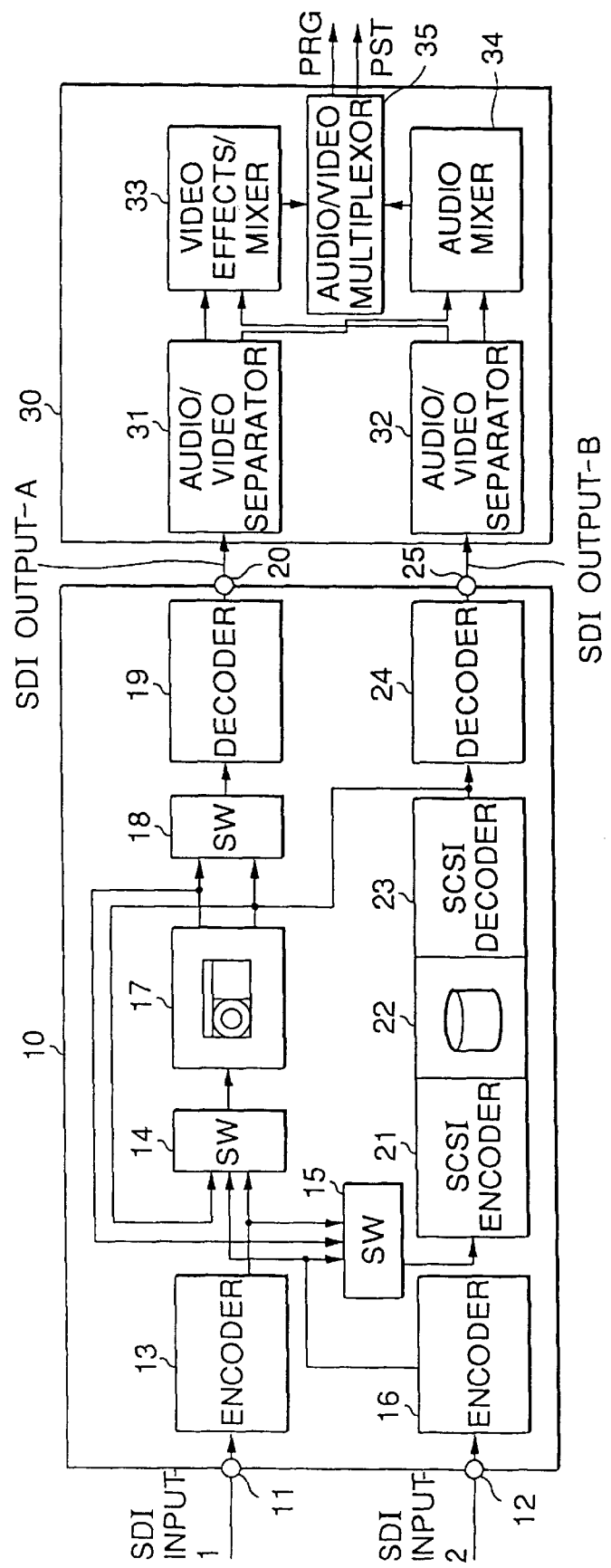
FIG. 3 is an outline block diagram showing the basic configuration of an AB roll editing system.

FIG. 3 is an outline block diagram showing the basic configuration of an AB roll editing system. As shown in FIG. 3, the AB roll editing system comprises the composite recording/playback device 10 and a switcher 30. The switcher 30 has audio/video separators 31 and 32 for two channels, with the video outputs of these audio/video separators 31 and 32 being connected to a video effects/mixer 33 and the audio outputs being connected to an audio mixer 34. The outputs of the video effects/mixer 33 and the audio mixer 34 are connected to an audio/video multiplexor 35. The output of this audio/video multiplexor 35 has a program output "PRG" for outputting programs that have been subjected to AB roll editing and a preset output "PST" in order to preview the next program.

In the AB roll editing, the configuration is such that the composite recording/playback device 10 simultaneously plays back signals recorded on the video tape record/playback block 17 and the hard disc drive block 22, respectively, and outputs the played back signals at the output terminals 20 and 25 via the decoders 19 and 24 as "SDI output-A" and "SDI output-B", respectively. Alternatively, the configuration can be such that the signals for two channel recorded at the hard disc drive block 22 are played back and outputted from the output terminals 20 and 25 via the decoders 19 and 24 as "SDI output-A" and "SDI output-B", respectively. The switcher 30 then receives the two channel SDI signal.

At the switcher 30 the audio signals and video signals are first separated at the audio/video separators 31 and 32, with the separated video signals being supplied to the video effects/mixer 33 and the separated audio signals being supplied to the audio mixer 34. At the video effects/mixer 33, the two channels of video signal provided are subjected to special effects of image processing or to video switching processing. Thus edited video signals are then outputted to the audio/video multiplexor 35. The two channels of audio signal provided are subjected to switching or mixing at the audio mixer 34 and then outputted to the audio/video multiplexor 35. Thus AB roll-edited audio signals and video signals are multiplexed at the audio/video multiplexor 35 and outputted as the program output "PRG" and the preset output "PST".

When the results of the AB roll editing are recorded at the video tape record/playback block 17 of the composite recording/playback device 10, the composite recording/playback device 10 plays back the two channel of signals recorded at the hard disc drive block 22 and outputs the played back signals from the output terminals 20 and 25 via the decoders 19 and 24 as "SDI output-A" and "SDI output-B", respectively. The switcher 30 then receives SDI signals for two channels.

At the switcher 30, the AB roll editing is carried out as in the above, and the program output "PRG" is inputted to the input terminal 11 or the input terminal 12 of the composite recording/playback device 10. The inputted signals are then compressed at the encoder 13 or the encoder 16, supplied to the video tape record/playback block 17 via the switch 14 and recorded.

Next, a specific example of a configuration of an AB roll editing system is described to which the composite recording/playback device 10 is applied.

Figure 4:
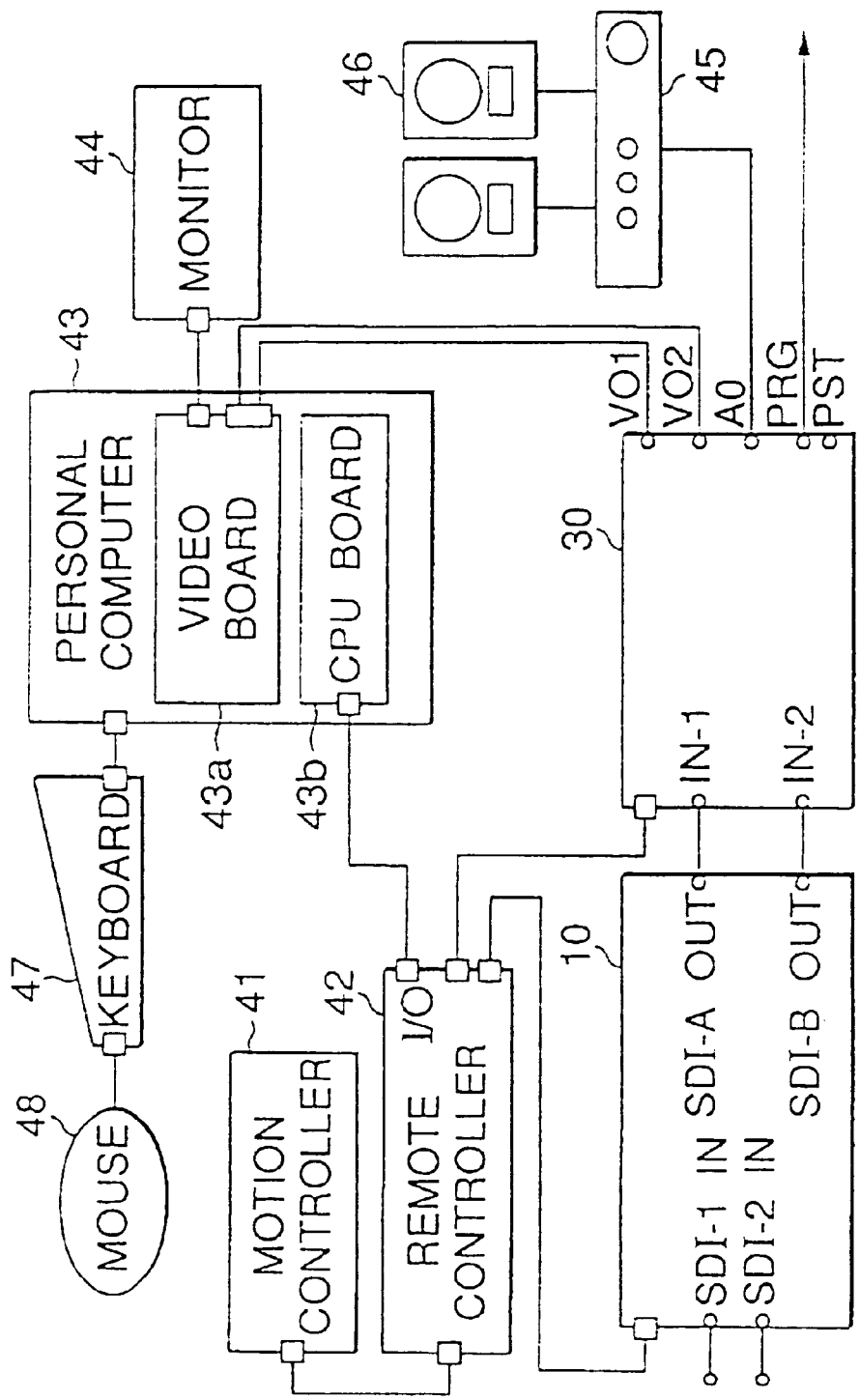
FIG. 4 is a block diagram showing an example configuration of an AB roll editing system.

FIG. 4 is a block diagram showing an example configuration of the AB roll editing system. In FIG. 4, a digital video camera such as being capable of outputting video signals for which the audio signals have been multiplexed is connected to the two input terminals "SDI-1 In, SDI-2 In" of the composite recording/playback device 10, whose two output terminals "SDI-A Out, SDI-B Out" are connected to the corresponding input terminals "IN-1" and "IN-2" of the switcher 30. The program output "PRG" of the switcher 30 is connected to such an installation that utilizes the editing results, for example, a broadcast installation. This switcher 30 has a video output terminal "V01, V02" for outputting video signals in the analog composite signal format and, additionally, an audio output terminal "AO" for outputting analog audio signals.

This AB roll editing system has a motion controller 41 with which the operator actually carries out editing operations, a remote controller 42 for providing control instructions for the composite recording/playback device 10 and the switcher 30 in synchronization with them, a personal computer 43, a monitor 44, an audio amplifier 45 and a speaker 46. The personal computer 43 has a video board 43a and a processor (CPU) board 43b for video edit processing installed at its PCI (Peripheral Component Interconnect) bus slots. A keyboard 47 is connected to the personal computer 43, with a mouse 48 being connected to this keyboard 47.

The output of the motion controller 41 is connected to the remote controller 42 and the control output of the remote controller 42 is connected to the corresponding control inputs of the composite recording/playback device 10 and the switcher 30. The I/O port of the remote controller 42 is connected to the processor board 43b mounted on the personal computer 43. The video input of the video board 43a mounted on the personal computer 43 is connected to the video output terminal "V01, V02" of the switcher 30 and the video output is connected to the monitor 44. The input of the audio amplifier 45 is connected to the audio output terminal "AO" of the switcher 30 and the output is connected to the speaker 46.

In the above configuration, the motion controller 41, remote controller 42, personal computer 43 and monitor 44 are configured as an editing controller for instructing the video tape record/playback block 17 and hard disc drive block 22 of the composite recording/playback device 10 to carry out operations such as "playback", "fast forward", "rewind" and "stop", and instructing the switcher 30 to carry out operations such as video changeover, image processing and volume control.

When carrying out the AB roll editing, material already recorded at the video tape record/playback block 17 and the hard disc drive block 22 of the composite recording/playback device 10 is played back and displayed on a GUI (Graphical User Interface) of the monitor 44. In and out points constituting editing points to be cut out are then decided while the played back display is being viewed. At this time, for the material recorded on the hard disc drive block 22, such non-linear editing as to carry out cutting the material out arbitrarily with respect to time is possible by utilizing the random accessibility of the hard disc drive. Information for these editing points is stored in the processor board 43b for finally controlling the composite recording/playback device 10 and the swithcer 30 on the basis of the stored information for the editing points. This enables a video program for one channel to be obtained on which AB roll editing has been carried out with respect to the materials for each of the channels recorded at the video tape record/playback block 17 and the hard disc drive block 22 of the composite recording/playback device 10, or the materials for two channels recorded at the hard disc drive block 22. The video program is outputted from the program output "PRG" for the switcher 30.

As described above, the composite recording/playback device according to the present invention is configured so that decoders capable of independently carrying out processing for a video tape recording/playback unit and a hard disc drive unit are individually provided. As a result of this, independent playback of the video tape recording/playback unit and the hard disc drive unit play back or two channel playback of the hard disc drive unit becomes possible to enable AB roll editing. Further, since two channel playback of the hard disc drive unit is possible, the results of the AB roll editing can be recorded at a video tape recording/playback unit while the AB roll editing is being carried out.

What is claimed is:

1. A composite recording/playback device having recording media of different forms, capable of individually recording and playing back while carrying out mutual dubbing as needed, comprising:

video tape record/playback means for performing linear record/playback processing using tape-shaped medium;

hard disc drive means for carrying linear record/playback processing using a discshaped medium;

first encoding means for compression processing a first signal and supplying said compression processed signal to at least one of said video tape record/playback means and said hard disc drive means;

first decoding means for selectively receiving and expanding one of playback signal of said video tape record/playback means and said hard disc drive means; and second decoding means for receiving and expanding a playback signal of said hard disc drive means, wherein the playback signal expanded by said second decoding means and the playback signal expanded by said first decoding means are outputted simultaneously.

2. The composite recording/playback device of claim 1, further comprising second encoding means for subjecting a second input signal to compression processing for selective supplying to one of said video tape record/playback means and said hard disc drive means.

3. The composite recording/playback device of claim 2, wherein said first and second input signals compression processed simultaneously by said first encoding means and said second encoding means, respectively, are recorded at said hard disc drive means.

4. The composite recording/playback device of claim 1, wherein said hard disc drive means plays back signals for two channels that are simultaneously expansion processed at said first and second decoding means, respectively.

5. An AB roll editing system, employing a composite recording/playback device equipped with recording media of different forms, comprising:

a composite recording/playback device having video tape recording/playback means, hard disc drive means, encoding means for compression processing a signal and supplying said compression processed signal to at least one of said video tape record/playback means and said hard disc drive means, first decoding means for selectively receiving and expanding one of playback signals of said video tape record/playback means and said hard disc drive means, and second decoding means for receiving and expanding a playback signal of said hard disc drive; and a switcher means for receiving each output from said first and second decoding means of said composite recording/playback device and carrying out editing so as to process two channels of video signals and audio signals into a one channel signal.

\* \* \* \* \*